Aug. 11, 1970
F. E. JENSEN
3,523,682
COMBINED CONVEYING AND DISTRIBUTING DEVICE
Filed Aug. 12, 1968
7 Sheets-Sheet 1
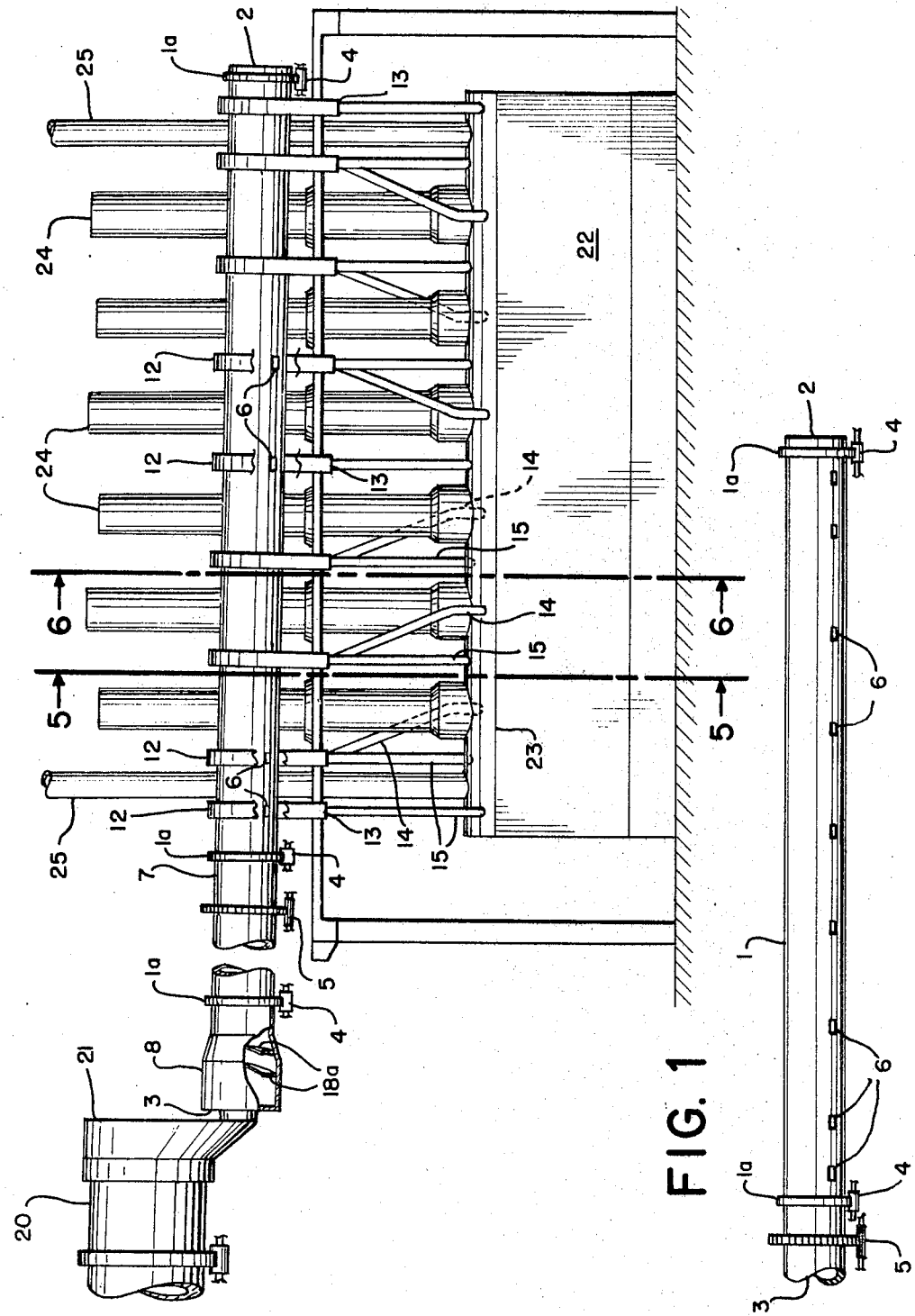
INVENTOR
FLEMMING E. JENSEN
BY
Pennie, Edmonds, Morton, Taylor & Adams
ATTORNEYS

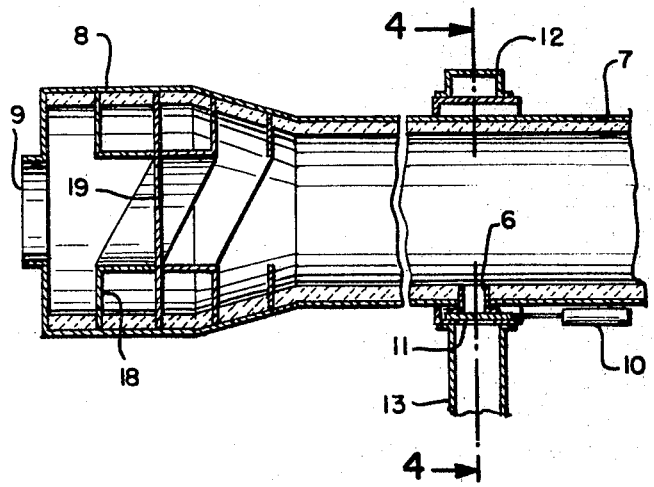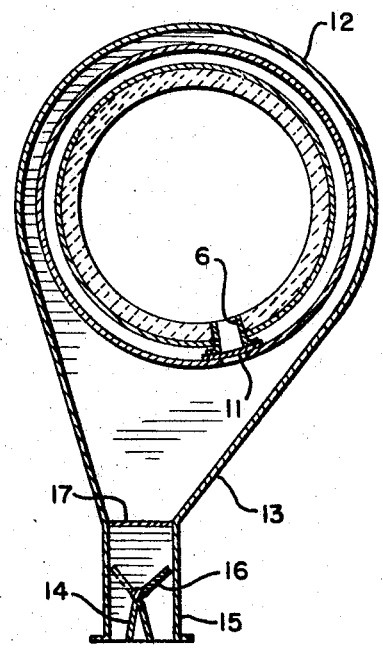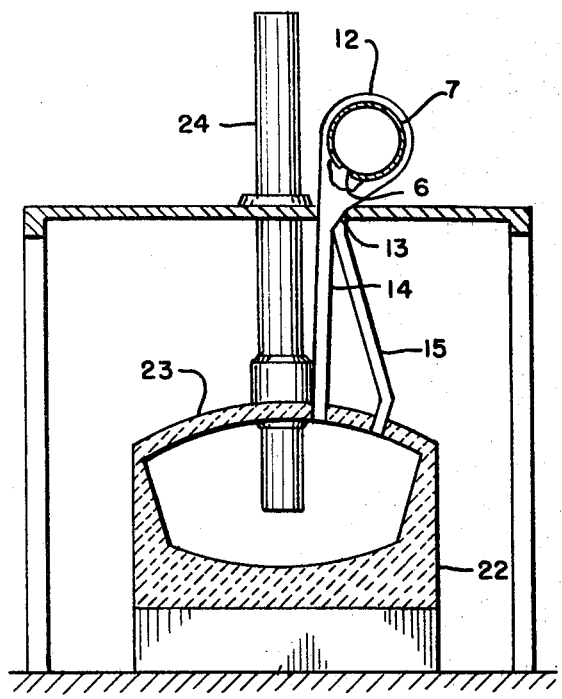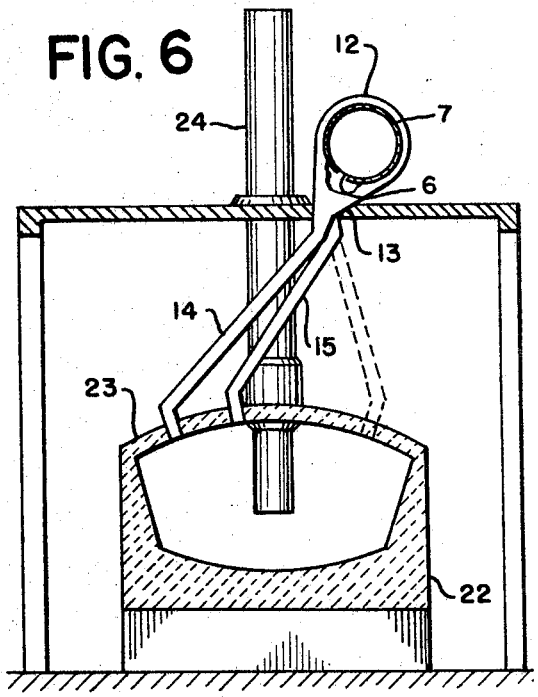
INVENTOR
FLEMMING E. JENSEN

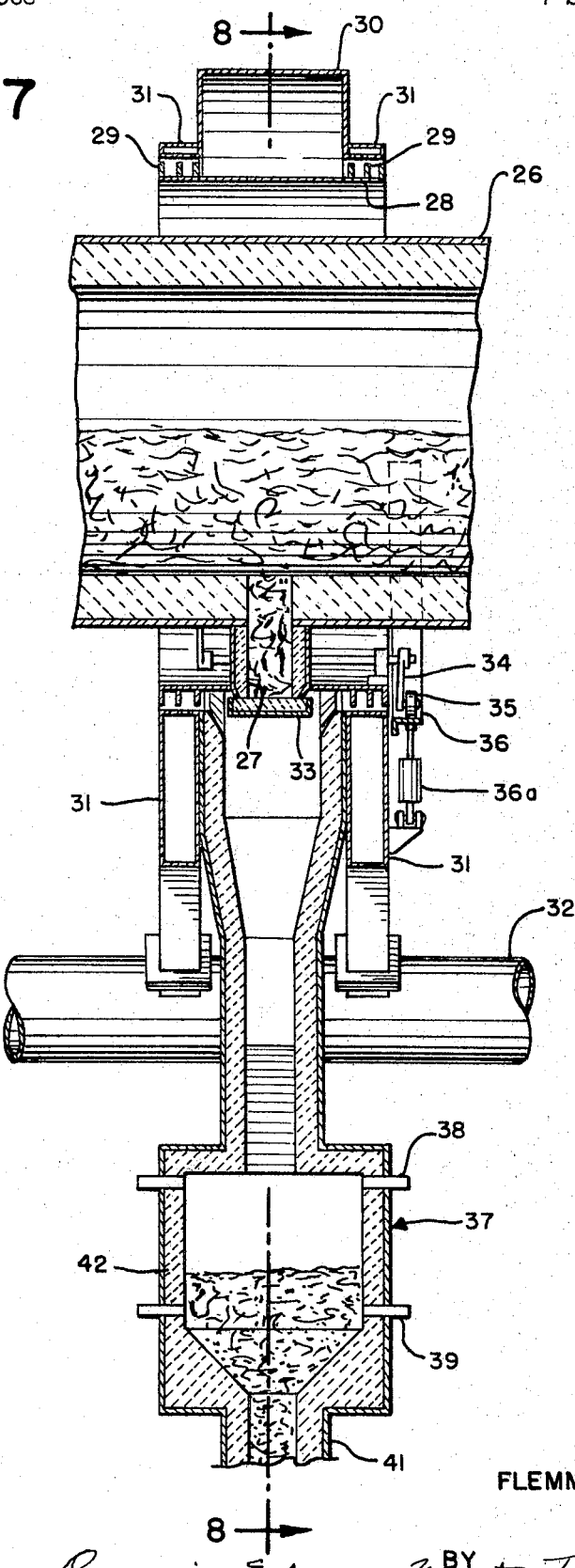

Aug. 11, 1970    F. E. JENSEN    3,523,682
COMBINED CONVEYING AND DISTRIBUTING DEVICE
Filed Aug. 12, 1968    7 Sheets-Sheet 4

INVENTOR
FLEMMING E. JENSEN

BY Pennie, Edmonds, Morton,
Taylor & Adams ATTORNEYS

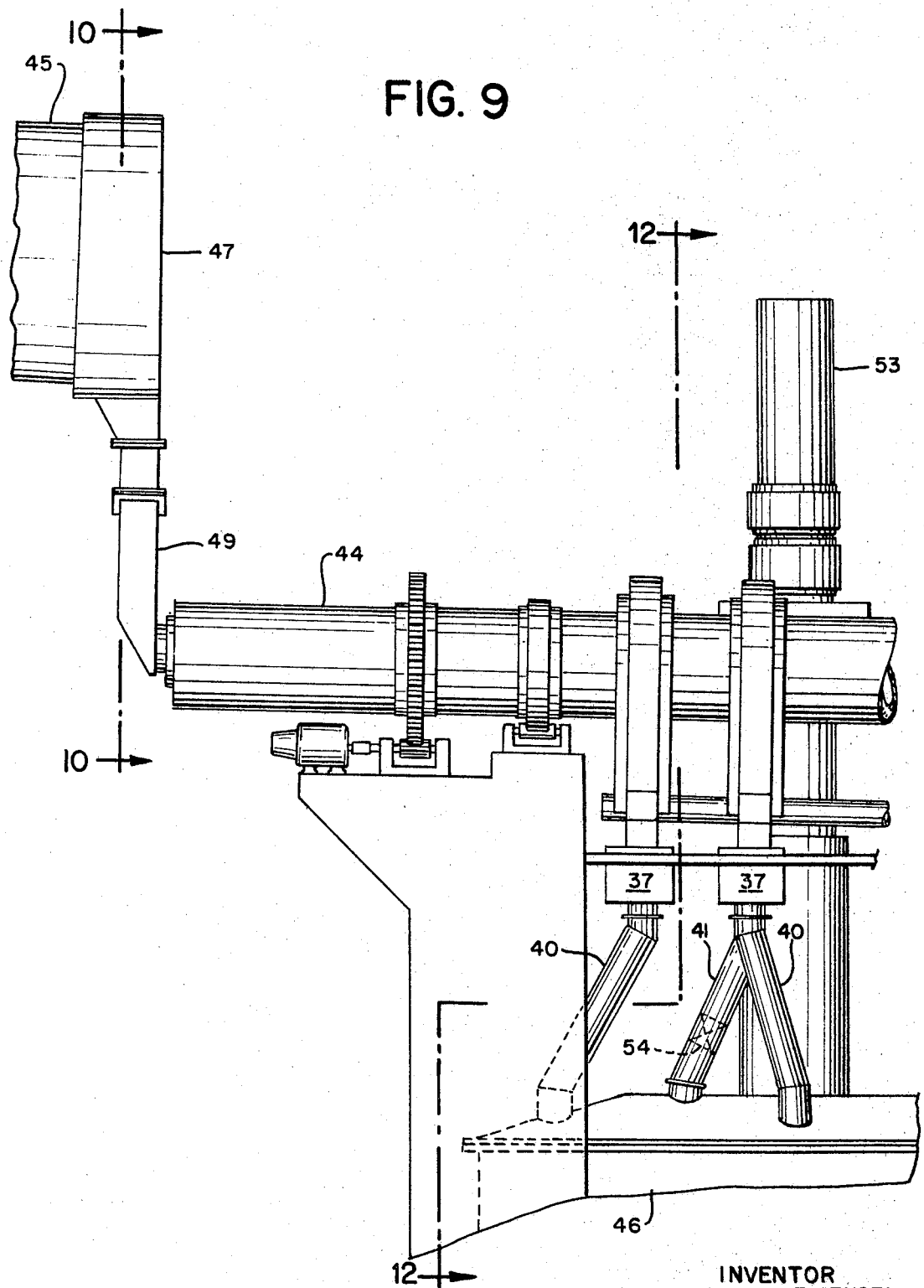

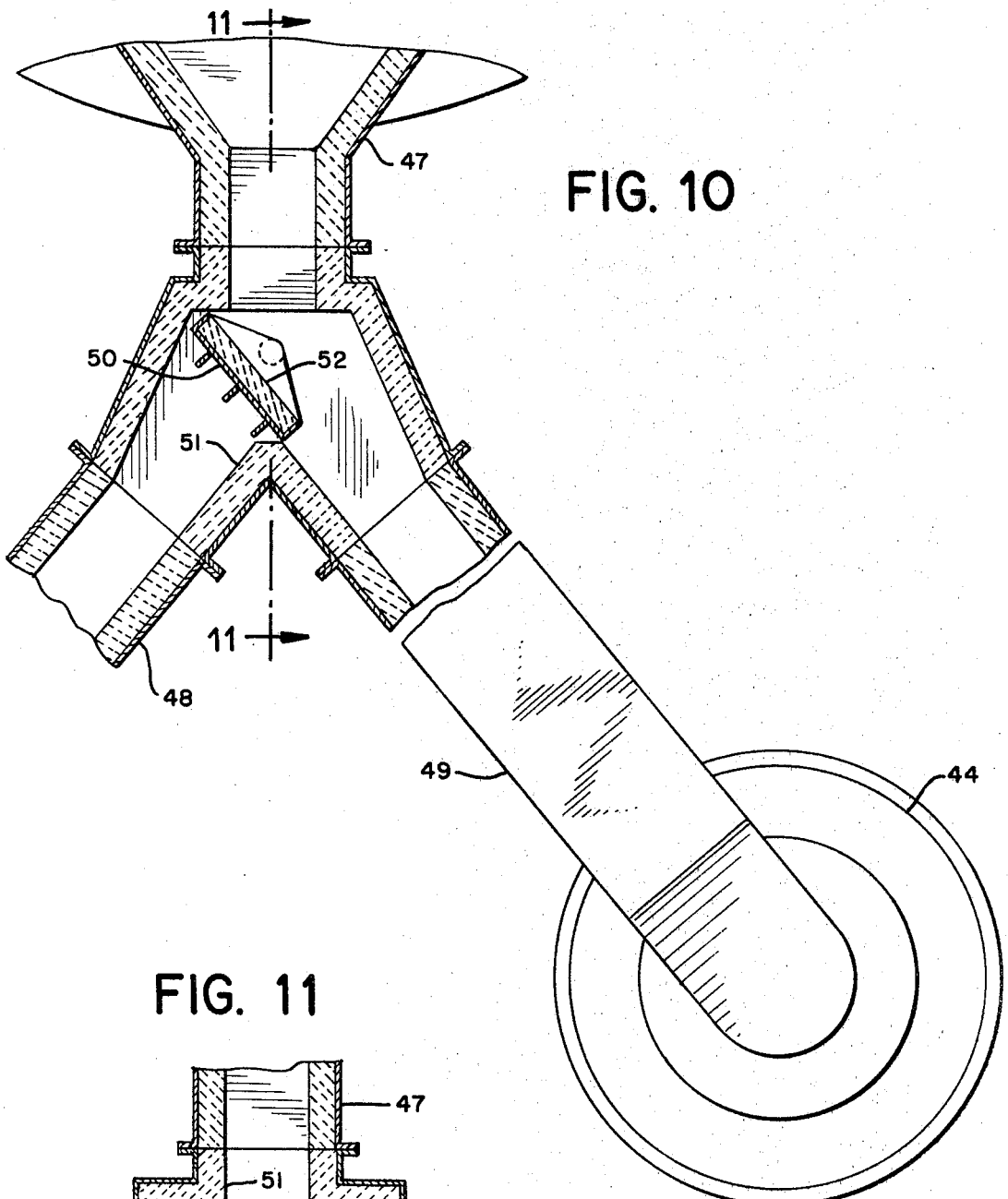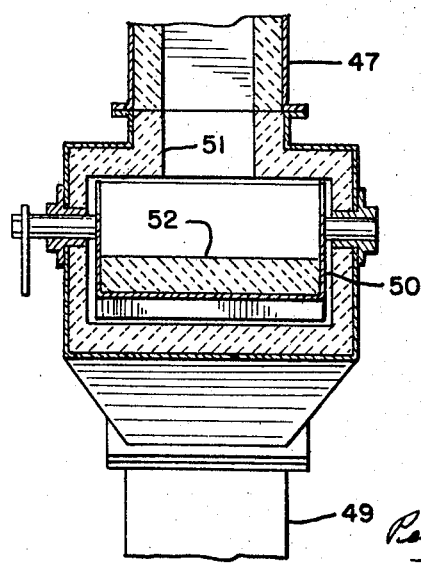

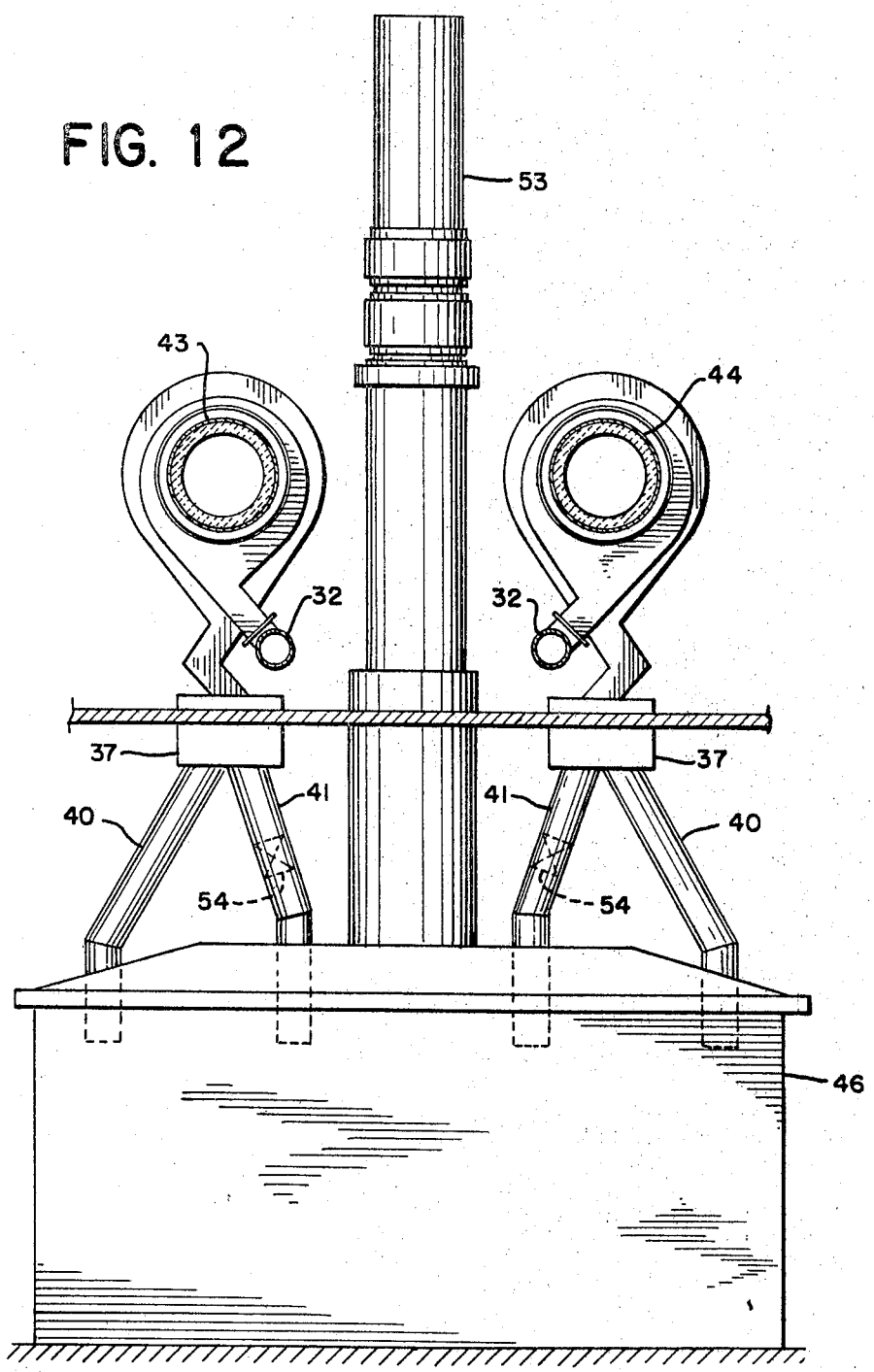

United States Patent Office 3,523,682
Patented Aug. 11, 1970

3,523,682
**COMBINED CONVEYING AND
DISTRIBUTING DEVICE**
Flemming Edwin Jensen, Copenhagen-Valby, Denmark,
 assignor to F. L. Smidth & Co., New York, N.Y., a
 corporation of Delaware
Filed Aug. 12, 1968, Ser. No. 751,983
Claims priority, application Great Britain, Aug. 16, 1967,
 37,797/67; Oct. 30, 1967, 49,208/67
Int. Cl. F27b 7/00
U.S. Cl. 263—33  11 Claims

ABSTRACT OF THE DISCLOSURE

Combined conveying and distributing device for conveying particulate, i.e. granular or fine-grained material, and distributing the material over a given area in a controlled manner.

BACKGROUND OF THE INVENTION

Granular or fine-grained material has usually been conveyed by means of, for example, chain or grate conveyors, steel bands or bucket conveyors, all of which involve complicated installations, particularly where the material conveyed has to be protected from the atmosphere.

SUMMARY OF THE INVENTION

In accordance with this invention, the device for conveying granular or fine grained material and distributing the material over a given area in a controlled manner, comprises a pipe rotatable about its axis, which is slightly inclined to the horizontal with a closed end of the pipe lowermost, the other end of the pipe having an inlet for the material, and the wall of the pipe between its end being formed with a number of openings, the arrangement being such that when the material is fed to the inlet and the pipe is rotated, the material is conveyed down the pipe and discharged through the openings.

If the pipe is arranged to be rotated, either continuously or intermittently, at a speed which can be adjusted, the rate at which the device conveys and distributes the material can be varied between wide limits.

The device is particularly suitable for conveying and distributing hot material processed in a protecting atmosphere or material having corrosive properties, such as granulated or pelletized ore, which during its transport from one furnace to another should be protected from the atmosphere to prevent oxidation. However, the use of the invention is not limited to such applications.

In some cases the feed of material to the pipe may not be continuous. For example, where the material is fed to the pipe from a rotary kiln, in which burning or sintering processes are carried out, crusts of the material are apt to build up on the wall of the kiln and when such crusts finally break down, there is a sudden increase in the discharge from the kiln.

To accommodate such changes in the feed, the pipe may have an increased diameter portion at its inlet end to form a material receiving chamber which will regulate the feed of material to the pipe proper, giving a substantially even distribution of material in the pipe. Advantageously, the receiving chamber is fitted with a screw feed device for loading material into the interior of the pipe to improve the control of the distribution of the material.

It is convenient to use a wear- and heat-resistant lining to protect the pipe itself, the maintenance of the conveying and distributing device thus being limited to repairs to, or replacement of, the lining.

The pipe can be closed against the surrounding atmosphere by providing a suitable seal at the inlet for material and by providing the discharge openings in the wall of the pipe with valves to control the discharge of material in such a way that the interior of the pipe and the material inside the pipe are isolated from the atmosphere. Any preferred composition of gases constituting the atmosphere inside the pipe may be maintained in this manner. To improve the seal, the material itself may during its discharge be guided in such a way as to produce a material seal which forms a barrier to the penetration of air from outside or other gases from apparatus into which the material is discharged.

The discharge openings in the wall of the pipe may be arranged in any suitable manner, but they are preferably arranged in rows on one or more generatrices of the pipe.

When the row of openings along a generatrix of the pipe is in its lowermost position, the rotation of the pipe may be stopped for a short while and the valves, if used, which close the discharge openings may be operated to allow discharge from some or all of the openings of the row.

It is often imperative that air from outside does not mix with the gases constituting the atmosphere inside the pipe and each discharge opening may therefore be covered by a substantially airtight stationary casing surrounding the pipe having a bottom hopper for distributing the material discharged from the opening. Each hopper may then have more than one delivery pipe, constituting the bottom discharge of the hopper, and it is possible by providing change over valves between the delivery pipes at the bottom of the hopper to distribute the material precisely as required by, for example the apparatus to which the material is delivered. In some circumstances, it is best to use two rotating pipes arranged side by side if very wide distribution of the material is desirable.

It has been found, that when the material is very hot, the outside wall of the pipe is subjected to excessive heating from the dicharged material, especially when the discharged material is retained in a hopper close to the pipe to form a material seal. To avoid this heating of the pipe wall, it is sometimes sufficient to arrange between each discharge opening and the hopper a dicharge duct which is angled or curved so that heat radiated from the material in the hopper towards the rotating pipe is obstructed.

Where this simple expedient is insufficient to prevent over-heating of the pipe wall, the pipe may alternatively or addtionally be surrounded by a protective casing in the region of each discharge opening, the casing being attached to but spaced from the pipe wall. When the hopper forms part of a stationary casing surrounding the pipe the stationary casing preferably surrounds the protective casing as well. Labyrinth seals may be provided between the two casings to prevent the passage of air into the hopper and, if necessary, a partial vacuum can be applied to the seals. Air drawn from the seals may then be used as, for example, secondary combustion air in an associated kiln.

When a material seal is to be provided by retaining material in each discharge hopper, a valve at each discharge opening of the rotating pipe may be controlled by a level sensing device in the corresponding discharge hopper, the arrangement being such that, when the level of material in the hopper falls below a predetermined minimum, the valve is automatically opened as soon as the opening from the pipe is next brought into register with the hopper or with the discharge duct if used.

The invention includes the combination of the conveying and distributing device, a rotary kiln for heat treatment of material, the material being discharged from the kiln in granular or fine-grained condition, and apparatus for further treatment of the material, for example, a melt-

BRIEF DESCRIPTION OF THE DRAWINGS

A conveying and distributing device according to the invention with four variations, illustrated in the accompanying drawings, in which:

FIG. 1 is a side elevation of a combined conveying and distributing device according to the invention;

FIG. 2 shows in elevation a combination including a rotary kiln, a conveying and distributing device and a melting furnace;

FIG. 3 shows in vertical section a variation of the inlet end portion of the conveying and distributing device of FIG. 1 and also shown in FIG. 2 and drawn to a larger scale;

FIG. 4 is a transverse section on line 4—4 of FIG. 3 drawn to a still larger scale;

FIG. 5 is a vertical section taken on line 5—5 of FIG. 2;

FIG. 6 is a similar section taken on line 6—6 of FIG. 2;

FIG. 7 is a part sectional elevation of a variation of a part of the device taken on line 7—7 of FIG. 8;

FIG. 9 is a side elevation of another variation of the device;

FIG. 10 is a view of part of the device of FIG. 9 with parts in section on the line 10—10 of FIG. 9;

FIG. 11 is a section taken on the line 11—11 of FIG. 10; and,

FIG. 12 is a section taken on the broken line 12—12 of FIG. 9.

DESCRIPTION OF THE PREFERRED EMBODIMENT

Figure 8:
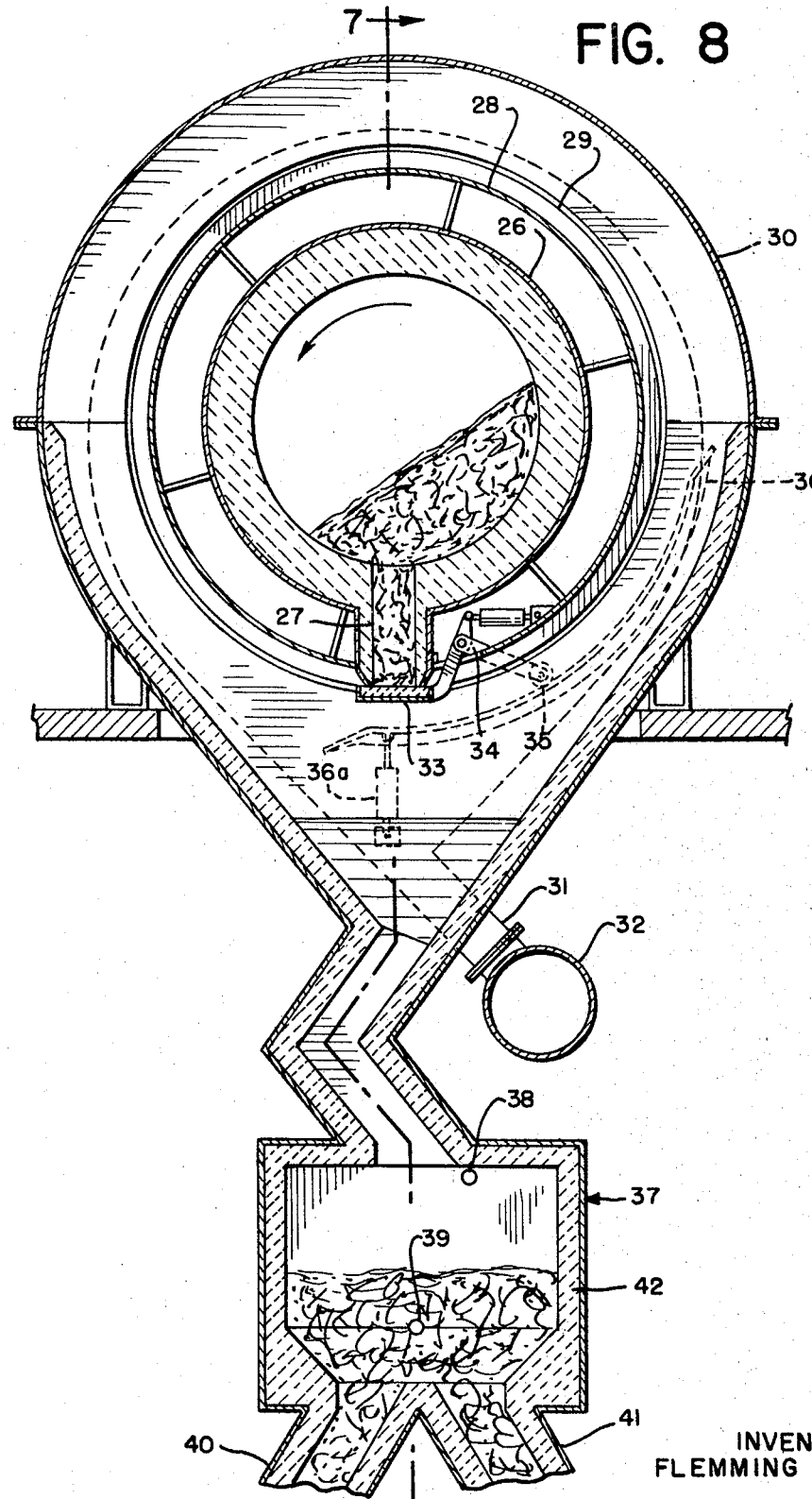
FIG. 8 is a section take on the line 8—8 in FIG. 7.

FIG. 1 shows a pipe 1 closed at one end 2 and open at the other opposite or left end 3. The pipe is equipped with live rings, 1a suitably spaced throughout its length and supported by rollers 4 and may be rotated at a driving station indicated at 5. As shown, pipe 1 has a number of openings 6 arranged on a generatrix of the pipe, that is, in lengthwise alignment. The pipe is mounted inclining slightly downwards towards the closed end 2, causing material fed to the inlet end 3 to perform a rolling and sliding motion towards the end 2 of the pipe. When the openings are in their lowermost position some of the material inside the tube will be discharged. The discharge will continue during an angular movement of the pipe dependent on the depth of the bed of material inside the pipe.

The openings 6, however, need not necessarily be on a straight line, but may be arranged along a helix or may be distributed arbitrarily on a longer or shorter section of the pipe or along its whole length.

When material is discharged from the discharge openings, the distribution of the material inside the pipe is for a short while uneven, but, because of the agitation of the material caused by the rotation of the pipe, the distribution of the charge inside the pipe is promptly equalized.

Considerable accumulation of material may occur at the closed end 2 of the pipe 1, but due to the rotation of the pipe a state of equilibrium is established and when material is discharged from the discharge openings near the closed end 2 the accumulated material takes part in balancing the equal distribution of the charge longitudinally of the pipe. This enables material to be stored temporarily in the pipe should discharge of material have to be interrupted for any reason.

In the variation shown in FIG. 3 the pipe 7 (similar to 1) has an inlet section 8 with a larger diameter than that of the pipe proper. Inlet section 8 constitutes a material receiving chamber and has an inlet opening 9 for the material to be distributed. Only a part of the pipe with one discharge opening 6 has been shown in FIG. 3. Discharge opening 6 is closed by a slide valve 11 which may be operated by a pressure cylinder 10 from a centralized control board. At each opening 6 the pipe is surrounded by a housing 12, the bottom of which has the form of a hopper 13 ending in two distributing chutes 14 and 15 through which the material is discharged.

The discharge through the chutes 14 and 15 is controlled by a change-over valve 16. By controlling these valves, it is possible to prevent appreciable quantities of air from entering the pipe through the discharge openings, and a further slide valve 17 may be installed in the bottom of the hopper so that a material seal can be formed between the slide valves 11 and 17.

The material receiving chamber 8 has a built-in helical pipe 18 of more than one turn to guide and transport the material fed to the chamber through the opening 9 into the pipe itself. A circular plate 19 forms an integral part of helical pipe 18 for form a seal or barrier at the inlet so that penetration of air through the material receiving chamber into pipe 7 is prevented.

In FIGS. 2, 5 and 6 is shown the combination of a rotary kiln 20 with a discharge hood 21 and a conveying and distributing device 7 (similar to device 1) which communicates with an electric melting furnace 22 through discharge chutes 14 and 15 leading through a top cover 23 of the melting furnace. The melting furnace is equipped with chimneys 25 for removal of the fumes produced during the melting or refining taking place in the furnace.

In the rotary kiln 20 a granular product of ores is produced and treated by heat and then discharged from the kiln through the discharge hood 21 which, through the material receiving chamber 8, communicates with the pipe 7. The material receiving chamber is provided with screw-threadsd lifters 18a which convey the granular product into the pipe 7. The rotary kiln and the conveying and distributing pipe are in communication and gas may pass between them. Hence the helical pipe 18 and barrier plate 19 of FIG. 3 are not desirable.

The granulated ores are discharged from the pipe 7 through the discharge chutes 14 and 15 and into the melting furnace. By operating the valves 11, 16 and 17, the ores may be fed to various points in melting furnace 22 in order to distribute the discharged material over the whole surface of the melt in the melting furnace.

In FIGS. 7 and 8, a rotatable distributor pipe 26 (similar to pipes 1 and 7) is shown with a discharge opening 27 at its lowest position. Surrounding the pipe with a clearance is a protective casing 28 formed with circumferential ribs 29. A stationary casing 30 surrounds the protective casing 28 and has two channels 31 which cooperate with the circumferential ribs 29 to provide a labyrinth seal to prevent the passage of air into the space between the two casings 28 and 30. The channels 31 are ducted to a pipe 32 through which air can be exhausted from the channels. The discharge opening 27 continues through the protective casing 28 and is closed by a flap valve 33. Valve 33 can be opened by means of a lever 34 which carries a roller 35.

As the pipe 26 rotates roller 35 bears against a curved guide bar 36. The bar 36 when in the position shown does not cause the roller 35 to move the lever but bar 36 can be moved inwards to a position in which when the roller bears against it the lever 35 is moved and thus opens the valve 33. Guide bar 36 is arranged so that when moved to its inward position, for example by a pressure cylinder 36a, the valve 33 will be opened for about 90° of rotation of the pipe 26. In some circumstances it is more convenient to control the valve 33 pneumatically or hydraulically rather than mechanically as described.

When material leaves the opening 27 it falls down a chute formed as can be seen in FIG. 8 with a knee and into a discharge hopper 37. Two level sensing devices 38 and 39 in the hopper 37 are arranged to cause cylinder 36a to move the guide bar 36 automatically outwards and inwards respectively. The level of material in the hopper is therefore held between the level sensing elements 38 and 39. The purpose of the knee in the chute leading into the hopper 37 is to prevent radiated heat from the material in the hopper impinging directly on the valve 33 and its associated moving parts. Two discharge chutes 40 and 41 conduct material from the hopper 37 to, for example a furnace to which the material is being fed and may incorporate further valves or material seals.

All the surfaces with which the hot material is likely to come into contact are lined with a suitable heat resistant material 42.

FIGS. 9 to 12 illustrate a combined conveyor distributing device having two rotating pipes 43 and 44 for conveying material from a rotary kiln 45 to an electric melting furnace 46.

From a discharge hood 47 of the rotary kiln, the material is alternately fed through the chutes 48 and 49 to the two rotating pipes 43 and 44. The feed to the chutes 48 and 49 is controlled by a gate 50 (FIG. 11) which automatically shifts from a position in which the chute 49 is closed and the chute 48 is fed and vice versa. The position of the gate 50 might for example be changed over every 5 minutes. The discharge hood 47, the connecting chutes 48 and 49 and the gate 50 are again protected against the wear and heat by heat resistant linings 51 and 52. If necessary the gate can be equipped with cooling channels through which cooling air or water can be passed.

As can be seen in FIG. 12 the two rotating pipes 43 and 44 are arranged roughly parallel above the melting furnace 46 and each pair of discharge chutes 41 and 40 leading from the respective hopper 37 are led one to the edge and one to the center of the melting furnace facilitating control of the distribution of the material fed into the furnace. A number of electrodes 53 are mounted in the centre of the furnace. In the vicinity of the electrodes the charge in the furnace is in a melted condition. The chutes 41 are therefore equipped with valves 54 to control the discharge in this region whereas the discharge through the chutes 40 nearer to the walls of the furnace do not usually require valves since the material close to the walls of the furnace is commonly solid and thus automatically controls the discharge of fresh material in that region.

I claim:
1. A device for conveying particulate material and distributing the material over a given area in a controlled manner, the device comprising a pipe having one end closed, means for mounting the pipe for rotation about its axis and slightly inclined to the horizontal, with the closed end lowermost, the opposite end of the pipe having an inlet for the material including a seal to prevent the entrance of atmospheric air, means for rotating the pipe, the wall of the pipe between its ends being formed with a plurality of openings, means for feeding material to the inlet of the rotating pipe the material being conveyed down the pipe and discharged through the openings, and a valve at each discharge opening in the wall of the pipe to control the discharge of the material in such a way that the interior of the pipe and the material inside the pipe are isolated from the atmosphere.

2. A device in accordance with claim 1, in which each discharge opening is provided with a discharge hopper including a material seal which forms a barrier to the penetration of air from outside and from gasses from apparatus into which the material is discharged.

3. A device according to claim 2, in which the valve at each discharge opening of the rotating pipe is controlled by a level sensing device in the corresponding discharge hopper in such a way that when the level of material in the hopper falls below a pre-determined minimum, the valve is automatically opened as the pipe rotates to a position in which material can next be discharged from the opening.

4. A device according to claim 2 in which each discharge opening is covered by a substantially air tight stationary casing which surrounds the pipe and of which the discharge hopper forms part.

5. A device according to claim 2 in which each hopper has more than one delivery pipe constituting the bottom discharge from the hopper and a change over valve between the delivery pipes.

6. A device according to claim 2 in which each discharge opening communicates with its hopper by a discharge duct which changes direction so that heat radiated from the material in the hopper towards the rotating pipe is obstructed.

7. A device according to claim 1 in which the pipe is surrounded by a protective casing at least in the region of each discharge opening, the casing being attached to and spaced from the pipe wall.

8. A device according to claim 7 in which the stationary casing of which the hopper forms part surrounds the protective casing and labyrinth seals are provided between the two casings to isolate the hopper from the atmosphere.

9. A device according to claim 1 in combination with a rotary kiln for heat treatment of material which is discharged from the kiln in particulate form and with apparatus for further treatment of the material.

10. A combination according to claim 9, in which the device includes two rotating pipes arranged to be fed with material from the same rotary kiln through a pair of chutes provided with a gate, and means for shifting said gate periodically from a position in which one chute is closed and the other chute is open and vice versa.

11. The combination of a rotary kiln for the heat treatment of material, said material being discharged from the kiln in granular condition, apparatus of elongated form for the further treatment of said material, and a device for conveying the granular material discharged from the kiln and distributing the same lengthwise throughout said elongated apparatus, said device comprising a pipe having one end closed, means for mounting the pipe for rotation about its axis and slightly inclined to the horizontal with the closed end lowermost, the upper end of said pipe having an inlet for said granular material, means for rotating the pipe, the wall of the pipe between its ends being formed with a plurality of lengthwise spaced openings, and means associated with each of said openings for conveying the granular material therefrom to a plurality of predetermined points spaced lengthwise of said apparatus.

References Cited

UNITED STATES PATENTS

| 2,259,702 | 10/1941 | Lindhard | 263—33 |
| 3,096,172 | 7/1963 | Zimmerley et al. | |
| 3,412,697 | 11/1968 | Matteini | 263—33 |

JOHN J. CAMBY, Primary Examiner

U.S. Cl. X.R.

214—18